Figure 1:
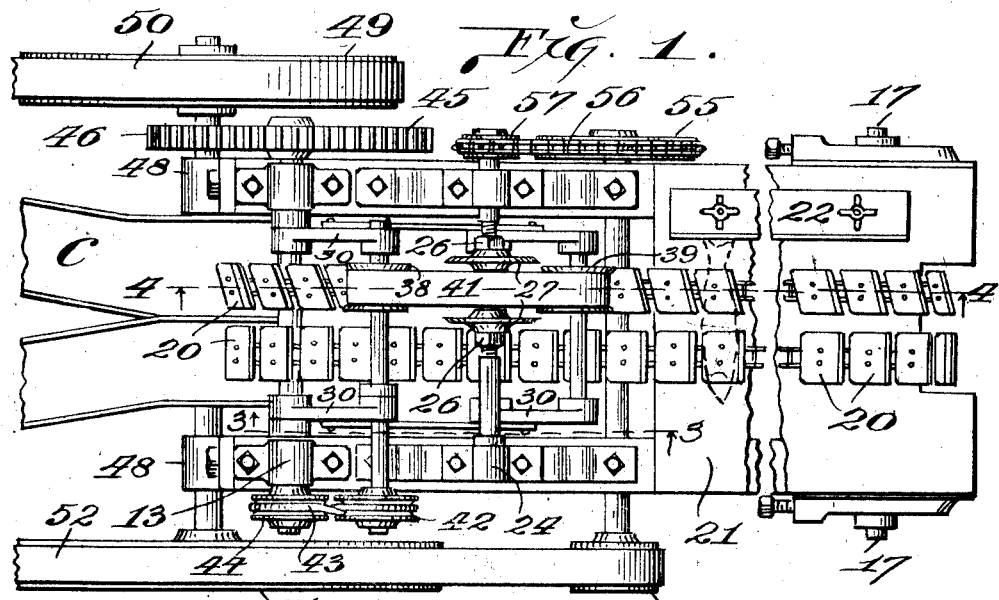

May 17, 1927.

H. E. BERGEN

FISH CUTTING MACHINE

Filed Feb. 11, 1926    2 Sheets-Sheet 1

1,628,765

Inventor:—
Harold E. Bergen.
By Martin C. Smith Atty.

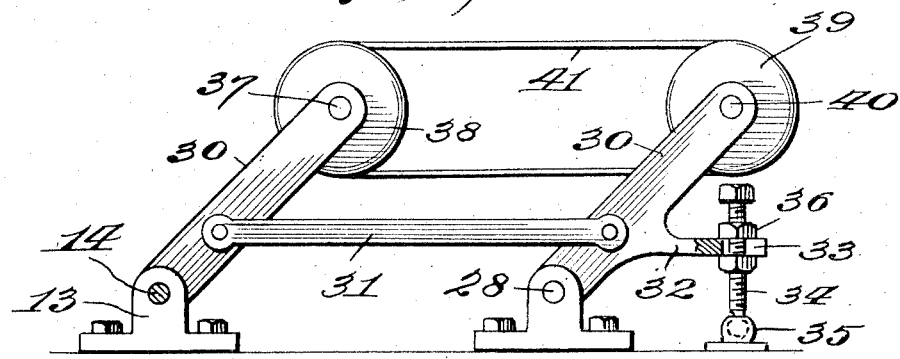
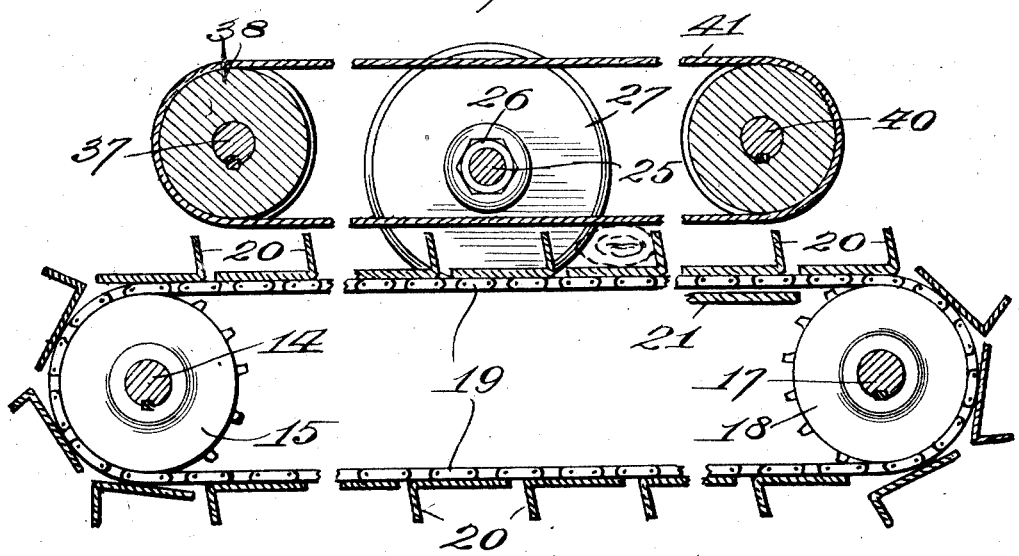

Patented May 17, 1927.

1,628,765

UNITED STATES PATENT OFFICE.

HAROLD E. BERGEN, OF SAN PEDRO, CALIFORNIA.

FISH-CUTTING MACHINE.

Application filed February 11, 1926. Serial No. 87,517.

My invention relates to a fish cutting machine and has for its principal objects the provision of a relatively simple, practical and easily operated machine that may be used to decided economic advantage in cutting fish so as to obtain for canning purposes that portion of the fish body that is made up of solid meat.

In the handling of certain kinds of fish and particularly in the conversion of the fish into an edible product and products that have certain commercial values, for instance, poultry food and fertilizer, it is desirable to cut the fish so as to obtain the solid meat portion that lies between the visceral cavity and the tail, such portion being put up in cans or suitable containers to provide a food product and the other portions of the fish being treated to form fish meal, fertilizers, poultry food, and like commercial products.

It is the purpose of my invention to provide a machine that will be highly efficient in handling within a given period of time a relatively large quantity of fish and which machine will be effective in very rapidly cutting the fish bodies so as to separate the solid meat portions thereof from the head and tail portions, thus enabling the conversion operations to be very rapidly and economically accomplished.

A further object of my invention is to provide an improved means in the form of a conveyor of special shape and pressure means cooperating therewith for holding the bodies of the fish firmly in position while said bodies are being engaged by the cutters that sever the solid meat portion of the fish body from the tail and head portion.

In this connection, it will be understood that practically all of the smaller varieties of fish that have the solid meat portions of their bodies cut away to provide an edible product, are relatively small and that the fish bodies taper both in width and thickness from an intermediate point toward the tail and on account of this tapering shape of the fish bodies and the fact that said bodies are very flexible and slippery, it is essential that suitable means be provided for firmly holding the bodies in proper position at the time they are engaged by the rotary cutters, for if they are not firmly held, the knives will not operate to the best advantage and there will be a certain amount of loss due to improper cutting.

Further objects of my invention are to provide a machine of the character referred to that may be readily adjusted in order to accommodate or handle fish of varying sizes.

With the foregoing and other objects in view, my invention consists in certain novel features of construction and arrangement of parts that will hereinafter be more fully described and claimed and illustrated in the accompanying drawings, in which—

Fig. 1. is a top plan view of a fish cutting machine embodying the principles of my invention.

Figure 2:
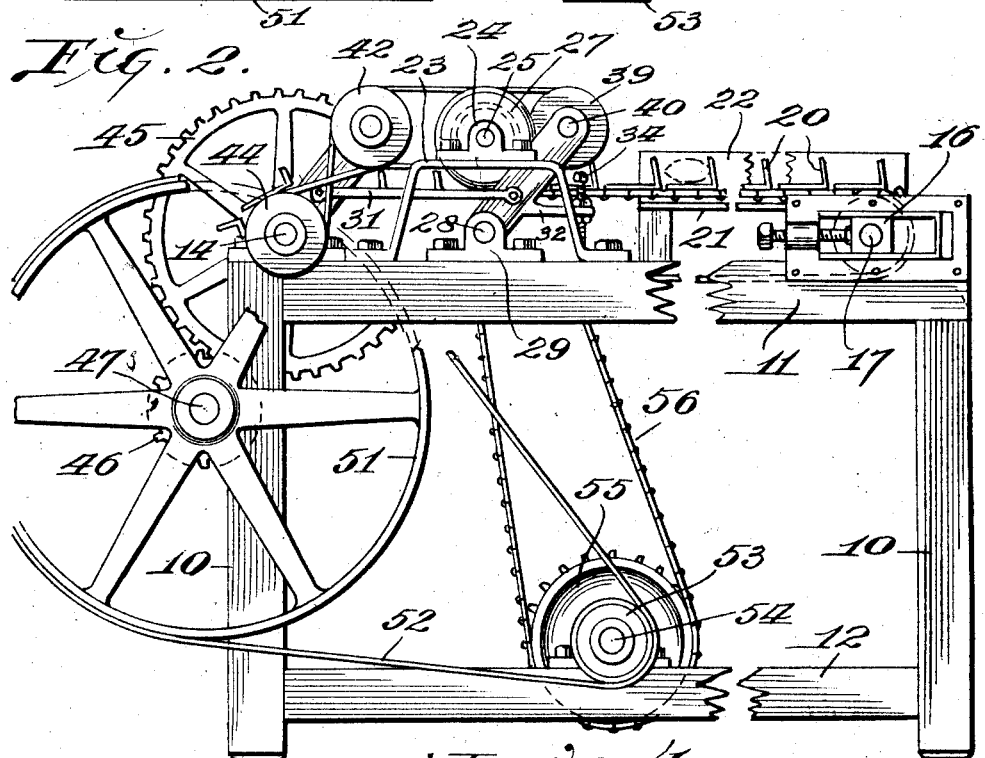

Fig. 2. is a side elevational view of the machine with parts thereof broken away.

Fig. 3. is an enlarged section taken approximately on the line 3—3 of Fig. 1.

Fig. 4. is an enlarged longitudinal section taken approximately on the line 4—4 of Fig. 1.

Referring by numerals to the accompanying drawings which illustrate a practical embodiment of my invention, 10, 10 designate the upright members or corner posts of the frame of the machine and which frame includes upper longitudinally disposed rails 11, lower longitudinally disposed rails 12 and suitably located cross rails not shown.

Journaled in suitable bearings 13 that are arranged on rails 11 near one end of the frame is a shaft 14 to which is fixed a pair of sprocket wheels such as 15, and journaled in longitudinally adjustable bearings 16 at one end of the frame is a similar shaft 17 carrying sprocket wheels 18. Arranged for operation on the respective pairs of sprocket wheels are sprocket chains 19 and secured thereto are substantially L-shaped fish supporting plates 20. One set of these plates, or the plates carried by one of the chains 19, is inclined slightly with respect to a transverse plane and which arrangement is provided in order that the upstanding flanges on the inclined plates will conform to the tapered rear portions of the fish bodies.

It will be understood that the members of each transversely arranged pair of plates 20 constitute a support for a fish body and the two sets of plates are spaced a sufficient distance apart for the accommodation of a rotary cutter hereinafter more fully described.

The bearings 16 for shaft 17 are made adjustable in order that any slack or lost motion that may develop in the chains 19 may be taken up.

Suitably supported on the end of the frame adjacent to shaft 17 is a plate 21, preferably formed of sheet metal, and which lies immediately beneath the over-running portions of the chains 19 and mounted for transverse adjustment on this plate and spaced a short distance away from the inclined series of fish supporting plates is a substantially L-shaped gage member 22, the upstanding flange of which occupies a position parallel with the fish carrier comprising the chains 19 and plates 20 carried thereby. This gage plate is utilized by the attendants of the machine to insure proper placing of the fish on the plates 20.

Supported on brackets 23 that project upwardly from the frame of the machine are bearings 24 for a transversely disposed shaft 25 and adjustably mounted on said shaft and held in their adjusted positions by lock nuts 26 are cutting disks 27 having sharpened marginal edges. These disks occupy positions to the sides of the series of inclined supporting plates 20 and they are mounted so as to be adjusted toward or away from each other in order to vary the length of the solid meat sections that are cut from the rear portions of the fish bodies.

Loosely mounted on shaft 14 and upon transversely disposed shaft 28 that is journaled in bearings 29, the latter being located directly beneath bearings 24, are the lower ends of upwardly projecting inclined arms 30. The arms forming one pair and which are mounted on shaft 14 are connected to the corresponding arms that are mounted on shaft 28 by horizontally disposed links 31, and thus the two pairs of arms are connected so as to move simultaneously.

Projecting horizontally from the pair of arms 30 that are mounted on shaft 28 are short arms 32, the outer portions of which are slotted as indicated by 33 for the reception of adjusting screws 34, the lower ends of which are rotatably held in sockets 35 and which latter are fixed to a part of the frame of the machine.

Arranged on the screws 34 above and below the arms 32 are lock nuts 36. By proper manipulation of the screws 34 and lock nuts 36, the pairs of arms 30 may be raised or lowered as desired.

Journaled in the upper ends of the pair of arms 30 that are carried by shaft 14 is a horizontally disposed shaft 37 on which is mounted a small drum or pulley 38 and a corresponding drum or pulley 39 is carried by a shaft 40 that is journaled in the upper portions of arms 30 that are carried by shaft 28. Arranged for operation on the drums or pulleys 38 and 39 is a flexible member 41, preferably a belt of rubber or suitable fabric, the same serving as a pressure member to hold the fish in position on the pairs of carrier plates 20 while said fish are being engaged by the rotary cutters 27 (see Fig. 4).

Mounted on one end of shaft 37 is a pulley 42 around which passes a belt 43 and which latter passes around a similar pulley 44 that is carried by the end of shaft 14. Pulleys 42 and 44 have the same diameter and belt 43 that operates on said pulleys is crossed in order that pulley 42, shaft 37, and pressure member 41, may be driven in the proper directions.

Fixed on the end of shaft 14 opposite from the end that carries pulley 44 is a gear wheel 45 that meshes with a much smaller gear wheel or pinion 46 and the latter being secured to a shaft 47. This shaft is journaled in bearings 48 on the end of the machine frame and carried by one end of said shaft is a belt wheel 49 that receives a power driven belt 50. Carried by the end of shaft 47 opposite the end that carries belt wheel 49 is a belt wheel 51 around which passes a belt 52 and the latter also passes around a relatively small belt wheel or pulley 53 that is fixed on the end of shaft 54. The last mentioned shaft is journaled in suitable bearings on lower member 12 of the machine frame and secured on the end of said shaft opposite the end that carries pulley 53 is a sprocket wheel 55. Operating on sprocket wheel 55 is a sprocket chain 56 that passes around a smaller sprocket wheel 57 and the latter being secured to the corresponding end of shaft 25 that carries the rotary cutters 27.

The operation of my improved fish cutting machine is as follows:

As power belt 50 is operated, belt wheel 49, shaft 47, and belt wheel 51 will be rotated and through belt 52 and pulley 53, rotary motion will be imparted to shaft 54. Through sprocket wheel 55, sprocket chain 56, and sprocket wheel 57, shaft 25, carrying the rotary cutters 27, will be rotated and simultaneously shaft 14 will be driven as a result of the engagement of pinion 46 with gear wheel 45.

Thus the fish carrying plates 20 on the over-running portions of the sprocket chains 19 will move toward the rotary cutters 27 and the pressure member 41, and which latter is positively operated by belt 43 that connects pulleys 42 and 44.

Operators stationed to the sides of plate or table 21, place fish on the transversely disposed pairs of carrier plates 20 with the tails of said fish abutting the upstanding portion of gage plate 22, and thus positioned, the fish are carried into engagement with the rotary cutters 27, which latter are driven at relatively high speed owing to the relative sizes of the pulleys 51 and 53, and sprocket wheels 55 and 57.

As the fish approach the rotary cutters, they will pass beneath and be engaged by pressure member 41, which latter is adjusted to operate at the proper height by manipulation of adjusting screws 34 and, as the fish come into contact with the sharpened edges of the rotary cutters, and while the cutting action is performed, said fish bodies will be retained in proper position upon the carrier plates until the bodies have been completely severed at two points.

Practically all the smaller varieties of fish taper in width and thickness from the centers of their bodies toward their tails and as the fish are very slippery and limber and therefore hard to handle, it is essential that proper means be provided to hold the bodies of the fish firmly in position on the two-part carrier while said bodies are engaged by the rotary cutters. For this reason I have provided one set of the plates forming the carrier with up-standing flanges that are inclined with respect to the flanges on the other set of plates, which inclined flanges bear against the tapered rear portions of the bodies of the fish and thereby provide a substantial bearing for the tapered portions of the bodies while the latter are being severed by the rotary cutters, and further, those portions of the fish bodies that lie on the carrier plates having the inclined flanges are firmly pressed against said plates and inclined flanges by the pressure belt 41 and, as a result, the rotary cutters effect clean cuts through the fish bodies and there is very little, if any, loss due to improper cutting of the fish.

In order to obtain the desired and more valuable portions of the fish bodies for canning purposes to provide an edible food product, the rotary cutters are adjusted so as to cut the fish bodies transversely on lines adjacent to or just below the end of the visceral cavity and at a point between the body of the fish and the relatively hard bony structure of the tail.

After passing beneath the rotary cutters, the cut-away head and tail portions of the fish will drop into suitable receptacles or conveyors positioned beneath the cutting machine, while that portion of the fish body that is to be retained for canning purposes will be carried on the inclined series of plates 20 to the discharge end of the machine where they will be received in a chute or conveyor such as C.

Thus it will be seen that I have provided a fish cutting machine that is relatively simple in construction, capable of being easily and cheaply produced, and which may be economically operated in cutting the fish bodies so as to separate the same into portions of different commercial values.

The fish bodies, while being engaged and severed by the rotary cutters are firmly held in proper position upon the pairs of carrier plates and the holding means and rotary cutters are readily adjustable in order to accommodate fish of varying sizes.

It will be understood that minor changes in the size, form and construction of the various parts of my improved fish cutting machine may be made and substituted for those herein shown and described without departing from the spirit of my invention, the scope of which is set forth in the appended claims.

I claim as my invention:

1. In a fish cutting machine, a conveyor formed in two parts, each part including a series of substantially L-shaped plates, the two series of plates being spaced apart the up-standing flanges on one series of the plates being inclined with respect to the flanges on the other series of plates for engaging and supporting the tapered portions of the bodies of the fish that are placed on said plates and a pair of rotary cutters arranged for operation adjacent to the edges of one of the series of plates forming a part of said endless conveyor.

2. In a fish cutting machine, a conveyor formed in two parts, each part including a series of substantially L-shaped plates, the two series of plates being spaced apart, the up-standing flanges on one series of the plates being inclined with respect to the flanges on the other series of plates for engaging and supporting the tapered portions of the bodies of the fish that are placed on said plates, a pair of rotary cutters arranged for operation adjacent to the edges of one of the series of plates forming a part of said endless conveyor and means for simultaneously operating said endless conveyor and said rotary cutters.

3. In a fish cutting machine, a conveyor formed in two parts, each part including a series of substantially L-shaped plates, the two series of plates being spaced apart the up-standing flanges on one series of the plates being inclined with respect to the flanges on the other series of plates for engaging and supporting the tapered portions of the bodies of the fish that are placed on said plates, a pair of rotary cutters arranged for operation adjacent to the edges of one of the series of plates forming a part of said endless conveyor and means for holding fish bodies on the plates of the endless conveyor while said bodies are engaged by said rotary cutters.

4. In a fish cutting machine, a conveyor formed in two parts, each part including a series of substantially L-shaped plates, the two series of plates being spaced apart the up-standing flanges on one series of the plates being inclined with respect to the flanges on the other series of plates for engaging and supporting the tapered portions of the bodies of the fish that are placed on said plates, a pair of rotary cutters arranged for operation adjacent to the edges of one of the series of plates forming a part of said endless conveyor, means for holding fish bodies on the plates of the endless conveyor while said bodies are engaged by said rotary cutters and means for simultaneously operating said endless conveyor, said rotary cutters and said fish body holding means.

5. In a fish cutting machine, an endless conveyor formed in two parts, each part comprising an endless chain, a series of fish-carrying plates carried by each chain, one series of plates being inclined with respect to the plates of the other series flanges projecting upwardly from the rear edges of the plates of both series for engaging and supporting the bodies of the fish that are placed on the conveyor and rotary cutters arranged for operation to the sides of the series of inclined plates.

6. In a fish cutting machine, an endless conveyor formed in two parts, each part comprising an endless chain, a series of fish-carrying plates carried by each chain, one series of plates being inclined with respect to the plates of the other series flanges projecting upwardly from the rear edges of the plates of both series for engaging and supporting the bodies of the fish that are placed on the conveyor, rotary cutters arranged for operation to the sides of the series of inclined plates and means for holding fish bodies on the endless conveyor while engaged by said rotary cutters.

7. In a fish cutting machine, an endless carrier comprising a pair of chains, a series of substantially L-shaped plates carried by each chain, the two series of plates being spaced apart, the plates of one series being inclined with respect to the plates of the other series rotary cutters arranged for operation adjacent to the ends of the series of inclined plates the up-standing flanges on the L-shaped plates in the inclined series providing bearings and supports for the tapered portions of the bodies of the fish while the same are engaged by said rotary cutters and means arranged for operation above the series of inclined plates for pressing the fish bodies onto said plates and against the flanges thereof while said fish bodies are engaged by the cutters.

In testimony whereof I affix my signature.

HAROLD E. BERGEN.